United States Patent Office 2,851,994
Patented Sept. 16, 1958

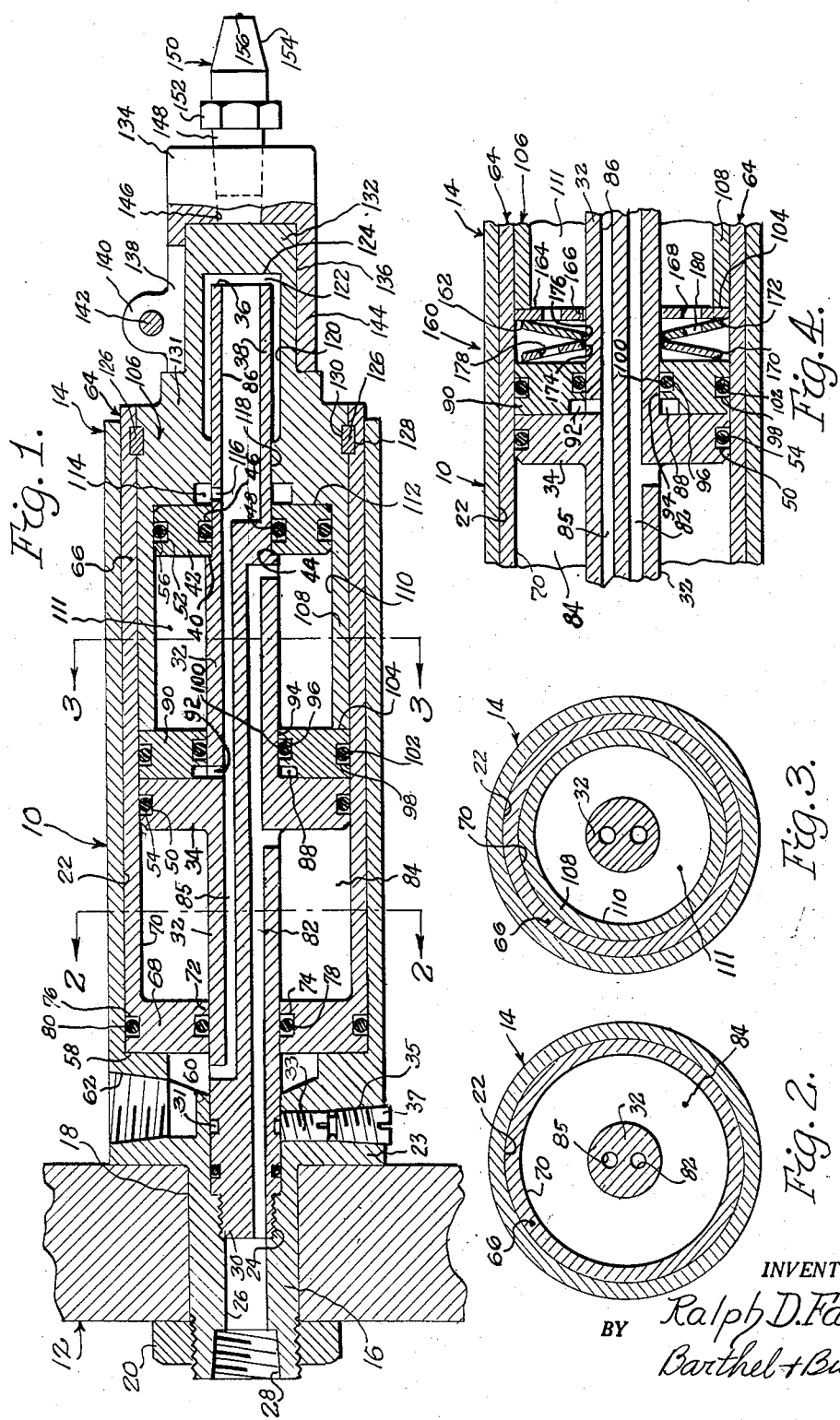

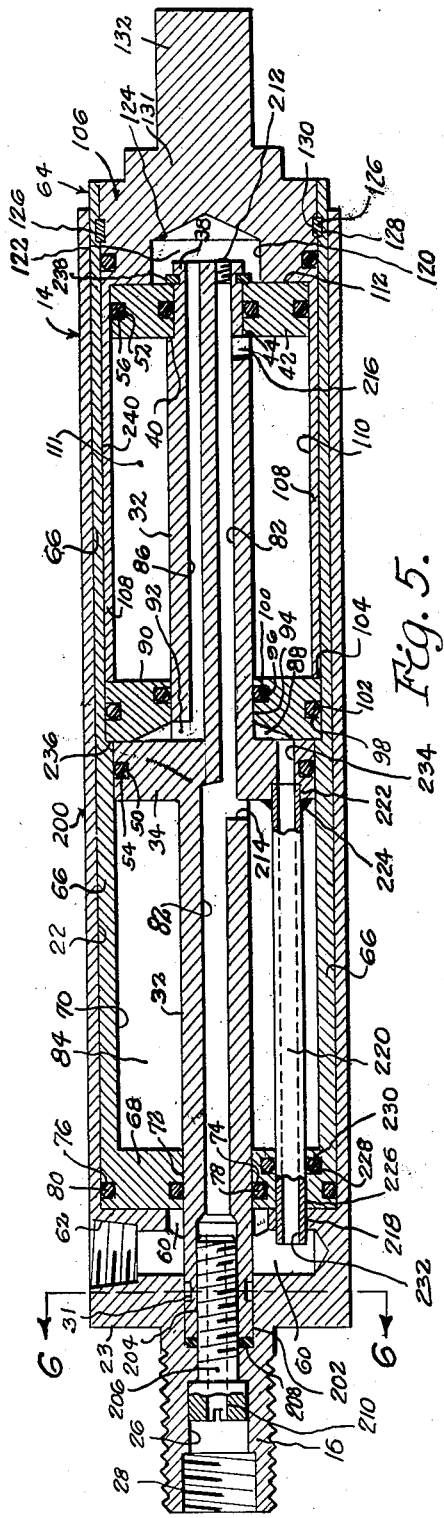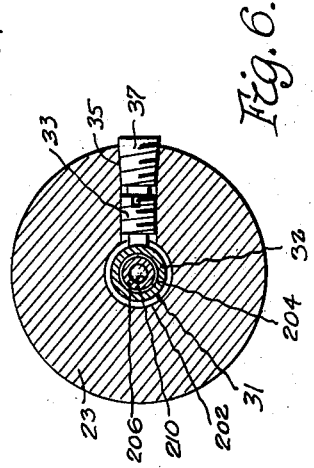

2,851,994

MULTIPLE-PISTON-HEAD CYLINDER FOR FIXTURE TYPE SPOT WELDING GUN

Ralph D. Fagge, Detroit, Mich.; Sophie A. Fagge, administratrix of said Ralph D. Fagge, deceased Application February 1, 1955, Serial No. 485,547

11 Claims. (Cl. 121—38)

This invention relates to spot welding equipment and, in particular, to spot welding guns.

One object of this invention is to provide a fixture type spot welding gun which is adapted to be used in machines for welding panels or the like and which has an unusually large piston displacement with a relatively small outside diameter and a relatively short stroke, in order to exert a much greater pressure upon the workpiece parts or sheets while they are being welded together.

Another object is to provide a fixture type spot welding gun of the foregoing character wherein the component parts are quickly and easily disassembled for repairs or replacement purposes.

Another object is to provide a fixture type spot welding gun of the foregoing character which is interchangeable with and adapted to replace conventional fixture type spot welding guns of lower pressure-exerting capacity.

Another object is to provide a multiple-piston extensible hydraulic motor which is adapted to actuate mechanical parts and which occupies only a fraction of the space occupied by a single-piston hydraulic motor of corresponding power and stroke.

Another object is to provide a multiple-piston extensible hydraulic motor, as set forth in the object immediately preceding, wherein a more powerful means for retracting the pistons is provided than has hitherto been available.

Other objects and advantages of the invention will become apparent during the course of the following description of the accompanying drawing, wherein:

Figure 1 is a central vertical longitudinal section through a fixture type spot welding gun suitable for actuation by compressed air, according to one form of the invention, shown in its mounted position in the welding set-up;

Figure 2 is a cross-section taken along the line 2—2 in Figure 1;

Figure 3 is a cross-section taken along the line 3—3 in Figure 1;

Figure 4 is a fragmentary central vertical section through a modified fixture type spot welding gun suitable for actuation by hydraulic fluid under pressure, having additional spring means for exerting a follow-up pressure for rapid action during welding;

Figure 5 is a central vertical longitudinal section through a modification of the hydraulic motor shown in Figure 4, wherein means is provided for exerting additional force on the pistons during their retraction stroke; and Figure 6 is a cross-section taken along the line 6—6 in Figure 5.

Referring to the drawings in detail, Figure 1 shows a fixture type spot welding gun, generally designated 10, mounted on a support, generally designated 12, for example, which may be a welding fixture set up for welding steel panels together in various types of welding work, such as in building railway car bodies for freight or passenger use, agricultural machinery, tanks and similar containers, prefabricated buildings, automotive vehicles, aircraft, or the like. The support 12 is part of a structure for supporting several welding guns, one only being shown.

The welding gun 10 is provided with an outer cylinder 14 having a reduced diameter inner end portion 16 which is held in a hole 18 in the support 12 by a nut 20 threaded on its outer end. The cylinder 14 has a bore 22 with an end wall 23 containing the threaded end 24 of an elongated bore 26 which terminates in a threaded outer end port 28 adapted to be connected to a conventional four-way compressed air control valve.

Threaded into the port 24 is the threaded rearward end 30 of an elongated stationary piston rod 32 having an integral piston head 34 thereon. The piston rod 32 is locked in position by a grove 31 engaged by the end of a headless set screw 33 which is threaded into a transverse bore 35 and held in place by a headless lock screw 37. At its forward end 36, the piston rod 32 has a reduced diameter portion 38 terminating in an annular shoulder 40 against which a smaller diameter forward floating piston head 42 abuts. The floating piston head 42 has a central hole 44 slidably receiving the stationary piston rod portion 38 and also has a central groove 46 containing a conventional rubber O-ring 48 for preventing leakage. The fixed integral rearward piston 34 and the fixed separable forward piston 42 are of different diameters but are provided with periphereal annular grooves 50 and 52 containing conventional O-rings 54 and 56 if different diameters, for also preventing leakage.

The outer cylinder bore 22 of the outer cylinder 14 at its rearward end terminates in an annular shoulder 58 with an annular chamber 60 between it and the threaded inner port 24. Opening into the annular chamber 60 is a threaded side port 62 in the side wall of the cylinder 14 for connection to the same conventional four-way valve as the threaded port 28, for example, by means of conventional flexible conduits or holes.

Reciprocably mounted in the outer cylinder bore 22 is a movable cylinder or outer cylindrical piston 64 consisting of a sleeve portion 66 terminating in an end wall 68 serving as a movable piston head, and having an inner bore 70 snugly but slidably fitting the outer diameter of the fixed integral rearward piston 34 on the stationary piston rod 32. The piston head 68 is provided with a central bore 72 snugly but slidably fitting the stationary piston rod 32 and also with inner and outer annular grooves 74 and 76 adapted to receive rubber O-rings 78 and 80 respectively, likewise for preventing leakage. The stationary piston rod 32 is provided with a lower passageway 82 running from the passageway 26 to the chamber 84 between the rearward stationary piston head 34 and the movable head 68 of the cylindrical piston 64, and also to the chamber 111 between the piston heads 90 and 42. The stationary piston rod 32 is further provided with an upper passageway 85 extending from the annual chamber 60 to an enlarged passageway 86 which continues through the forward portion of the stationary piston rod 32 to the forward end 36 thereof.

Opening from the passageway 86 into an annular chamber 88 in a rearward floating movable piston head 90 is a port 92 for admitting and discharging air or other operating fluid from the annular chamber 88. The rearward floating piston head 90 in the retracted position of the gun 10 abuts the stationary rearward piston 34 and has a central bore 94 slidably engaging the piston rod 32 on the forward side thereof from the stationary piston 34. The rearward floating piston 90 is likewise provided with inner and outer annular grooves 96 and 98 equipped with O-rings 100 and 102 respectively for preventing leakage of fluid.

The rearward floating piston 90 is of substantially the same diameter as the stationary piston 34, so as to snugly but slidably engage the bore 70 of the cylindrical piston 64, and on its rearward side engages the annular rearward end 104 of an inner cylindrical piston, generally designated 106, consisting of a sleeve portion 108 with a bore 110 therein forming a chamber 111 and terminating in an annular shoulder or end wall 112 adjoining an annular chamber 114 with a port 116 leading to it through the reduced diameter portion 38 of the stationary piston rod 32 from the passageway 86 thereof. The inner cylindrical piston 106 is provided with a central bore 118 snugly but slidably fitting the reduced diameter forward portion 38 of the stationary piston rod 32, and forwardly of the bore 118 is provided with an enlarged bore 120 forming a forward end chamber 122 terminating in an end wall 124. The sleeve portion 108 of the inner cylindrical piston 106 is drivingly connected to the sleeve portion 66 of the outer cylindrical piston 64 by a snap ring 126, the pistons 64 and 106 being provided with aligned grooves 128 and 130 for receiving the coupling ring 126. The piston 106 has a piston head 131 thereon.

The inner cylindrical piston 106 is provided with a reduced diameter extension 132 into which the bore 120 extends. Mounted on the extension 132 is a cup-shaped adapter or electrode holder 134 having a bore 136 snugly-receiving the extension 132 and also having a longitudinal slot 138 provided with ears 140 (only one of which is shown) bored to receive a clamping bolt 142. By means of the clamping bolt 142, the ears 140 may be drawn together so as to narrow the slot 138 and clamp the sleeve portion or skirt 144 of the adapter 134 tightly to the extension 132 of the inner cylindrical piston 106. The adapter or electrode holder 134 is provided with a tapered bore 146 for receiving the shank 148 of a conventional welding electrode 150 having the usual hexagonal portion 152 thereon and provided with the usual tapered nose 154 terminating in the welding contact end 156 which engages the sheet metal or other workpiece. It will be understood that a similar welding electrode 150 is mounted on the opposite side of the workpiece (not shown) in a stationary position capable of sustaining the thrust brought about by the action of the welding gun 10, as described below. This fixed electrode (not shown) and the movable electrode 150 are connected, by suitable electrical welding conductors (not shown), to a welding transformer or other suitable source of welding current, as is well known among welding engineers and others skilled in the electric welding art.

In the operation of the fixture type welding gun 10 shown in Figures 1 to 3 inclusive, the threaded ports 62 and 28 are connected, as previously stated above, to a conventional four-way compressed air control valve and the latter in turn connected to a source of compressed air. The welding gun 10 is also, as stated above, connected to a welding transformer or other source of welding current supplying such current to the electrode 150, the opposite electrode (not shown) being connected to the opposite polarity of the welding transformer. When it is desired to make a weld, the work, such as two sheet metal plates, is placed in the gap between the end 156 of the welding electrode 150 and the corresponding stationary welding electrode (not shown).

To make a weld, the operator now shifts the four-way valve (not shown) to connect the port 62 to a source of compressed air or other compressed gas, and to connect the port 28 to exhaust or discharge the entrapped air into the atmosphere. When this occurs, compressed air or other suitable compressed gas flows from the port 62 into the annular rearward chamber 60 and acts against the rearward end of the piston head 68 of the cylindrical outer piston 64, forcing the latter to the right and carrying with it the inner cylindrical piston 106 to which it is connected by the snap ring 126. At the same time, compressed air flows through the upper passageway 85 through the port 92 of the passageway 86 into the annular chamber 88, where it acts against the rearward end of the forward floating piston 90, which reacts relatively to the stationary piston 34 and against the annular end 104 of the inner cylindrical piston 106 to impart further force to the motion of the latter. At the same time, compressed air also flows from the passageway 86 through the port 116 into the annular chamber 114 where it acts against the floating piston head 42 as an abutment held stationary by the shoulder 40 and also against the annular shoulder or end wall 112 of the inner cylindrical piston 106 to impart a thrust to the inner piston 106 relatively to the stationary piston head 42 to add further force to the motion of the inner cylindrical piston 106. In addition to this, compressed air passing to the right from the bore 86 into the chamber 122 acts against the end wall 124 thereof and thereby adds to the force exerted by the outer and inner cylindrical pistons 64 and 106 upon the electrode holder 134 and its welding electrode 150.

Meanwhile, air has been exhausted from the rearward chamber 84 and from the intermediate chamber 111 through the passageways 26 and 82 as the outer and inner cylindrical pistons 64 and 106 move to the right. In this manner, the plates or other parts to be spot welded are forced powerfully together between the welding electrodes, and as the metal softens under the heat of the welding current, a quick follow-up action is imparted by the instantaneous response of the resilient compressed air upon the above-mentioned pistons to further push the movable electrode 150 to the right to take up the slack resulting from the melting or softening of the metal.

When the weld has been completed, the operator reverses the four-way compressed air control valve (not shown) to exhaust air from the side port 62 and to supply compressed air simultaneously to the end port 28. As a result of this action of the compressed air passing through the passageways 26 and 82 into the chamber 84, the piston head 68 of the outer cylindrical piston 64 is moved to the left and thereby retracted until it comes to a halt against the end wall 58 of the outer cylinder 14. Meanwhile, the air compressed in the chambers 111 and 122 by this action passes through the ports 92, 116 and the end of the passageway 86 through the latter and thence through the passageway 85 outward through the side port 62 to an exhaust opening in the four-way valve.

The modified fixture type spot welding gun, generally designated 160, shown in Figure 4 differs from the welding gun 10 only in the construction of its central portion shown in Figure 4, the remainder of the welding gun 160 being of identical construction with the welding gun 10. Similar parts in Figure 4 are therefore designated with the same reference numerals as in Figures 1 to 3 inclusive. The modified welding gun 160 is particularly adapted for actuation by a hydraulic liquid, such as oil under pressure, which is incompressible in comparison with compressed air. It lacks the resilience and consequent follow-up action of compressed air after welding has commenced and the metal has softened under the heat developed by the electric welding current at the point of welding.

For these reasons, the modified welding gun 160 is provided with a booster or resilient follow-up device, generally designated 162, interposed between the floating piston 90 and the annular abutment end 104 of the sleeve portion 108 of the inner piston 106. The follow-up device 162 consists of a perforated abutment disc 164 of substantially the same diameter as the floating piston 90 in order to be freely slidable within the bore 70, the peripheral portion of the disc 164 engaging the annular abutment end 104 of the sleeve portion 108 of the inner piston 106. The abutment disc 164 is provided with a central hole 166 slightly larger than the stationary piston rod 32 over which it slides, and is also provided with intermediate holes 168 through which the hydraulic liquid can pass. Disposed between the perforated abutment disc 164 and the floating piston 90 are two oppositely-cupped resilient spring discs 170 and 172 respectively, these discs being of similar but oppositely-curved construction having enlarged central holes 174 and 176 for loosely receiving the piston rod 32 and having perforations 178 and 180 for the passage of hydraulic fluid. The spring discs 170 and 172 abut one another adjacent their central holes 174 and 176 but are of slightly smaller diameter than the bore 70 so as to permit free passage of fluid past their peripheries.

The operation of the modified fixture type spot welding gun 160 of Figure 4 is similar to that described above in connection with the operation of the fixture type spot welding gun 10, except that the working fluid is a hydraulic liquid under pressure, such as oil, and the conventional four-way valve is of suitably modified construction, as is known to hydraulic engineers. The intake and discharge of the hydraulic fluid occurs in the same manner as the compressed air mentioned above in connection with the operation of the welding gun 10. When, in making a weld, the outer and inner cylindrical pistons 64 and 106 have reached the end of their stroke, and the welding softens the metal of the workpiece, an almost instantaneous take-up of the slack thereby occurring between the rearward floating piston 90 and the inner cylindrical piston 106 is provided by the two cupped spring discs 170 and 172. The latter, by their resilience, have been flattened out during the initial part of the stroke of the floating piston 90, placing them in a state of compression with consequent possession of potential energy. The softening of the metal of the workpiece during welding enables the compressed cupped spring discs 170 and 172 to spring back into or toward their original cupped shapes, thereby further forcing the inner cylindrical piston 106 forward and with it the movable electrode 150.

It will also be evident that the welding gun 10 is usable as a multiple-piston hydraulic motor in locations where greater compactness is desired or necessitated than is provided by a single-piston hydraulic motor. In such an installation, the welding electrode 150 is replaced by a suitable connection threaded into the bore 146 and attached to the part or machine element to be moved. This hydraulic motor is useful, for example, in actuating the moving parts of road machinery and is of much smaller diameter than a single cylinder of the same power, so that it occupies much less space than the space occupied by a single cylinder of corresponding power and stroke. While the hydraulic motor 10 is preferably operated by a hydraulic fluid, such as oil under pressure, it is also capable of operation by other types of hydraulic fluid or by compressed gases, such as compressed air.

The modified multiple piston hydraulic motor shown in Figures 5 and 6, generally designated 200, has many features of construction in common with the motor shown in Figures 1, 2 and 3, and corresponding parts are accordingly designated with the same reference numerals. The modified motor 200, however, is capable of exerting a more powerful retraction force during the retraction stroke thereof than is the motor 10 shown in Figure 1 or the motor 160 shown in Figure 4. This added power for retraction is especially valuable where heavy parts must be lifted back to their starting positions, such as, for example, certain of the movable implements of earth-moving machinery, especially road-building machinery.

In the motor 200 of Figures 5 and 6, the stationary piston rod 32, instead of being threaded into a threaded socket as in Figure 1, is seated in a smooth-walled socket 202 and provided with a threaded extension 204 of the passageway 82 adapted to receive the threaded shank of a screw 206, the head of which is seated in the shouldered end of the bore 26 and thereby draws the end of the piston rod 32 snugly up against the packing 208 at the end of the socket 202. The screw 206 is provided with a longitudinal passageway 210 therethrough, leading from the bore 26 into the passageway 82 of the piston rod 32, so as to permit flow of fluid between the port 28 and the passageway 82.

The outer end of the passageway 82 (Figure 5) is threaded to receive a screw plug 212 which effectively closes it. The stationary piston rod 32 is provided with transverse ports 214 and 216 located respectively near the middle and forward end of the piston rod 32. The port 214 opens into the chamber 84 between the rearward stationary piston head 34 and the movable head 68 of the cylindrical piston 64. The port 216, on the other hand, opens into the chamber 111 within the sleeve portion 108 of the inner cylindrical piston 106.

The end wall 23 of the cylinder 14 is provided with a bore 218 opening into the annular chamber 60, which receives the rearward end of an elongated tube 220, the forward end of which is seated in a counterbore 222 in the stationary piston head 34, as by welding at 224. The outer surface of the tube 220 slidably engages a bore 226 which passes through the end wall 68 of the outer cylindrical piston 64, which is provided with an annular internal groove 228 containing a conventional "O-ring" 230. The tube 220 contains a bore or passageway 232 which at one end opens into the annular chamber 60 and at its other end opens into a passageway or bore 234 through the stationary piston head 34 and communicates with the annular chamber 88 between the the stationary piston head 34 and the movable piston head 90.

The movable piston head 90, however, is not floating, as in Figure 1, since it does not reciprocate freely in the bore 70 within the cylindrical piston 64, but is held in a counterbore 240 against an annular shoulder 236 between the counterbore 240 and the bore 70 by the end of the sleeve 108 of the inner cylindrical piston 106. The inner cylindrical piston 106, as previously stated, is drivingly secured to the outer cylindrical piston 68 by the snap ring 126 in the concentric grooves 128 and 130 thereof. Moreover, the piston head 42 at the outer end of the stationary piston rod 32 in Figure 5 no longer is a floating piston head, but is locked in position on the reduced diameter piston rod end portion 38 against the annular shoulder 40 by a snap ring 238, the end of the reduced diameter portion 38 being grooved to receive the snap ring 238.

In the operation of the hydraulic motor 200, let it be assumed that the motor 200 has been mounted in any suitable way, such as by inserting the threaded end portion 16 into a corresponding hole in a suitable support, and held in position by a nut (not shown). Let it also be assumed that the threaded ports 62 and 28 have been connected to a conventional four-way control valve and the latter in turn connected to a source of hydraulic fluid under pressure. Let it further be assumed that a motion-transmitting connection has been secured to the forward end extension 132 of the piston head 131 of the hydraulic motor 200 for the purpose of connecting the latter to the mechanism or part to be operated thereby.

To project the forward end 132 of the motor 200, the operator shifts the control valve so as to connect the port 62 to the pressure port of the control valve and the port 28 to the discharge or suction port thereof. Pressure fluid then flows into the annular chamber 60 where it acts against the left-hand or rearward end of the piston head 68 of the cylindrical outer piston 64, forcing the latter forward to the right and carrying with it the inner cylindrical piston 106 connected thereto by the snap ring 126. Due to the presence of the annular shoulder 236 between the bores 70 and 240 in the outer cylindrical piston 64, the piston head 90 is also carried forward at this time.

The piston head 42, however, on the outer or forward end of the stationary piston rod 32 cannot move, as in the motor 10 of Figure 1, but is held fixedly in position by the snap ring 238.

At the same time that hydraulic pressure fluid is acting upon the rearward end of the piston head 68, a portion of it flows through the bores 232 and 234 of the tube 220 and stationary piston head 34 respectively, entering the annular chamber 88 and acting upon the rearward end of the piston head 90, causing the latter to exert a push on the end of the sleeve 108 of the inner cylindrical piston 106 so as to assist the piston head 68 of the outer cylindrical piston 64 in moving the load on the forward end 132 to the right. At the same time, hydraulic pressure flows from the annular chamber 88 through the port 92 and passageway 86 into the end chamber 122 where it acts against the end wall 124 and annular shoulder 112 of the piston head 131 of the inner cylindrical piston 106, further assisting the moving of the load. Thus, the three piston heads 68, 90 and 131 cooperate substantially simultaneously to move the load attached to the extension 132.

Meanwhile, the fluid within the chamber 84 of the outer cylindrical piston 64 is discharged through the port 214 into the passageway 82 of the stationary piston rod 32 as the piston head 68 moves forward, this fluid continuing through the bore 210 of the screw 206 into the passageway 26 and outward through the port 28 to the discharge side of the control valve. At the same time, the fluid within the chamber 111 of the inner cylindrical piston 106 is discharged through the port 216 into the passageway 82, joining the fluid discharged therein through the port 214 to flow outward through the discharge port 28. The stationary piston heads 23, 24 and 42 serve as thrust abutments for the hydraulic pressure fluid acting against the movable piston heads 68, 90 and 131 during forward travel thereof.

To retract the piston head extension 132 and the mechanism attached to it, the operator reverses the four-way control valve previously mentioned (not shown) so as to connect the threaded port 28 to the pressure port of the valve and the threaded port 62 to the discharge or suction port thereof. Hydraulic pressure fluid then flows through the passageway 26, bore 210 of the screw 206, and passageway 82 of the stationary piston rod 32 through the port 214 into the annular chamber 84 within the outer cylindrical piston 64, acting against the forward end of the piston head 68 and forcing it to the left rearwardly upon its retraction stroke. The hydraulic fluid behind it is forced into the annular chamber 60 and thence through the threaded port 62 into the discharge line leading to the discharge port of the valve. At the same time, hydraulic pressure fluid also flows from the passageway 82 of the fixed piston rod 32 through the port 216 into the annular chamber 111 within the inner piston rod 106, acting against the forward side of the piston head 90, also forcing it against the annular shoulder 236 of the sleeve 66 of the outer cylindrical piston 64, assisting the piston head 68 in retracting the outer piston 64.

The fluid displaced by the piston head 90 in its retraction stroke is forced out of the annular chamber 92 between the piston head 90 and the stationary piston head 34 through the passageway 86 into the forward or end chamber 122 adjacent the piston head 131. Thus, the retraction of the mechanism attached to the extension 132 of the piston head 131 of the inner and outer cylindrical pistons 106 and 64 is accomplished by the action of the movable piston heads 68 and 90, thereby giving a powerful retraction effect capable of lifting heavy machines or machine parts.

What I claim is:

1. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons.

2. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passsageways therethrough communicating with certain of said cylinder bores on opposite sides of said stationary piston head, and means for drivingly interconnecting said outer and inner hollow pistons, said inner hollow piston having therein a bore and a forward cylinder chamber communicating with said bore, said stationary piston rod passing through said bore and having a fluid supply passageway communicating with said chamber.

3. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said fluid supply passageway in said stationary piston rod having a port extending into the space between said stationary piston head and said floating intermediate piston head.

4. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said fluid supply passageway in said stationary piston rod having a port extending into the space between said inner floating piston head and said inner hollow piston head wall.

5. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said fluid supply passageway in said stationary piston rod having a port extending into the space between said stationary piston head and said floating intermediate piston head, said fluid supply passageway in said stationary piston rod also having a port extending into the space between said inner floating piston head and said inner hollow piston head wall.

6. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said inner hollow piston having therein a bore and a forward cylinder chamber communicating with said bore, said stationary piston rod passing through said bore and having a fluid supply passageway communicating with said chamber, said fluid supply passageway in said stationary piston rod having a port extending into the space between said stationary piston head and said floating intermediate piston head.

7. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said inner hollow piston having therein a bore and a forward cylinder chamber communicating with said bore, said stationary piston rod passing through said bore and having a fluid supply passageway communicating with said chamber, said fluid supply passageway in said stationary piston rod having a port extending into the space between said stationary piston head and said floating intermediate piston head, said fluid supply passageway in said stationary piston rod also having a port extending into the space between said inner floating piston head and said inner hollow piston head wall.

8. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said stationary piston rod having a reduced diameter inner end portion remote from its mounting in said outer cylinder, and said inner floating cylinder being reciprocably mounted on said reduced-diameter portion.

9. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said inner hollow piston having therein a bore and a forward cylinder chamber communicating with said bore, said stationary piston rod passing through said bore and having a fluid supply passageway communicating with said chamber, said stationary piston rod having a reduced diameter inner end portion remote from its mounting in said outer cylinder, and said inner floating cylinder being reciprocably mounted on said reduced-diameter portion.

10. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, one of said floating piston heads being disposed with a space between it and said inner hollow piston, and a resilient compressible take-up element disposed in said space.

11. A fixture type spot welding gun comprising an outer cylinder having therein an outer cylinder bore and a fluid supply port communicating therewith, a hollow stationary piston rod fixedly mounted in one end of said cylinder and projecting axially along said cylinder bore, an outer hollow piston reciprocably mounted in said outer cylinder bore and having a head wall bored for the passage of said piston rod, said outer hollow piston having therein an intermediate cylinder bore, said stationary piston rod having thereon a stationary piston head snugly engaging said intermediate cylinder bore for relative reciprocation therebetween, an inner hollow piston reciprocably mounted in said intermediate cylinder bore and having therein an inner cylinder bore and an inner head wall facing in the opposite direction from the head wall of said outer hollow piston, a pair of floating intermediate and inner piston heads reciprocably mounted on said stationary piston rod in axially-spaced relationship in said intermediate and inner cylinder bores respectively, said stationary piston rod having fluid supply and exhaust passageways therethrough communicating with certain of said cylinder bores on opposite sides of said stationary piston head, and means for drivingly interconnecting said outer and inner hollow pistons, said intermediate floating piston head being disposed with a space between it and said inner hollow piston, and a resilient compressible take-up element disposed in said space.

References Cited in the file of this patent

UNITED STATES PATENTS

| | | |
|---|---|---|
| 786,409 | Coon | Apr. 4, 1905 |
| 2,085,105 | Lex | June 29, 1937 |
| 2,300,172 | Platz | Oct. 27, 1942 |
| 2,383,082 | Rossmann | Aug. 21, 1945 |
| 2,642,165 | Banker | June 16, 1953 |
| 2,739,571 | Hall | Mar. 27, 1956 |

FOREIGN PATENTS

| | | |
|---|---|---|
| 105,833 | Sweden | Oct. 27, 1942 |